United States Patent [19]

Fujiwara

[11] 4,133,301

[45] Jan. 9, 1979

[54] GAS HEATING METHOD AND APPARATUS

[76] Inventor: Akinobu Fujiwara, 3204 Shimohatsukari Hatsukari-cho, Otsuki City, Japan, 409-11

[21] Appl. No.: 804,757

[22] Filed: Jun. 8, 1977

[30] Foreign Application Priority Data

| Jul. 29, 1976 [JP] | Japan | 51/90610 |
| Dec. 7, 1976 [JP] | Japan | 51/146816 |
| Dec. 7, 1976 [JP] | Japan | 51/146815 |
| Mar. 30, 1977 [JP] | Japan | 52/35769 |

[51] Int. Cl.$^2$ .............................................. B23K 3/02
[52] U.S. Cl. ..................................... 126/413; 431/344
[58] Field of Search ............. 126/237, 238, 236, 229, 126/401, 402, 403, 404, 405, 406, 407, 408, 409, 410, 411, 412, 413, 414; 431/2, 344

[56] References Cited

U.S. PATENT DOCUMENTS

| 497,526 | 5/1893 | Pentoney | 126/238 |
| 2,807,317 | 9/1957 | Penno | 126/413 |
| 2,997,869 | 8/1961 | Weiss | 126/401 X |
| 3,759,245 | 9/1973 | Greco | 126/406 |
| 3,845,755 | 11/1974 | Aske | 126/226 X |

FOREIGN PATENT DOCUMENTS 1903764   9/1970  Fed. Rep. of Germany ........... 126/413

*Primary Examiner*—Edward G. Favors
*Attorney, Agent, or Firm*—Wenderoth, Lind & Ponack

[57] ABSTRACT

A heating method and apparatus which involves burning an air-gas mixture whose combustion is promoted by the action of two kinds of catalyzers to be converted to a high-temperature thermal energy for soldering, desoldering, cutting and other similar processes. A controlled amount of liquefied gas from a gas container is electrically ignited and burned by the catalysis action in a combustion chamber, and the converted flameless thermal energy is conducted through a heat conductor, concentrating a high-temperature heat on the tip of the conductor. The gas used usually includes liquefied hydrocarbons such as petroleum oil gas, natural gas, manufactured gas, propane gas and the like.

23 Claims, 18 Drawing Figures

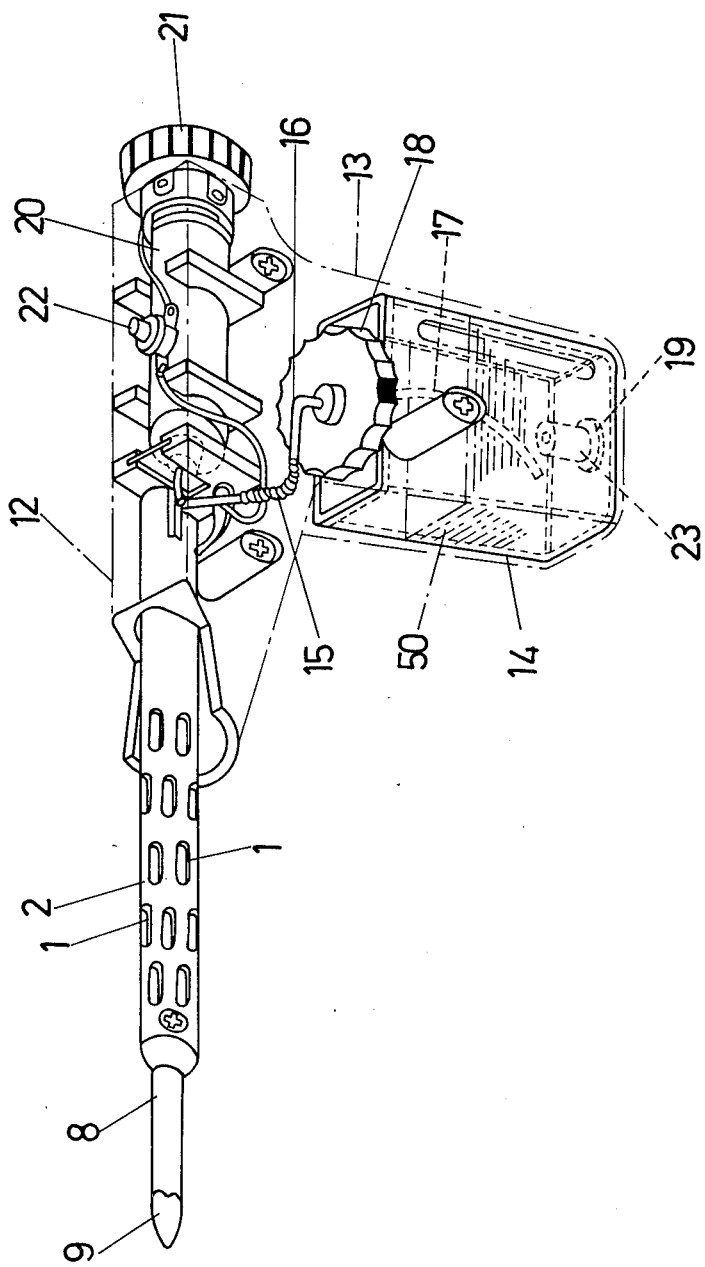

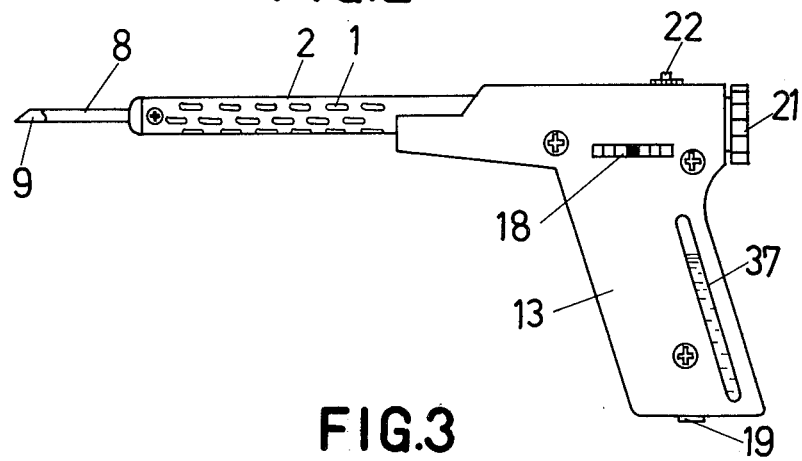
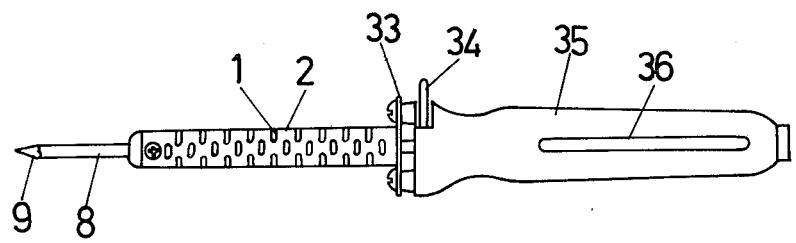
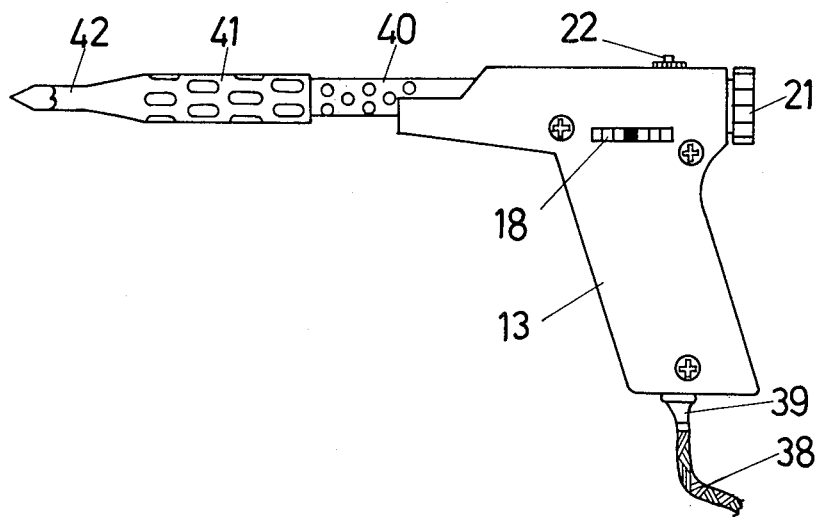

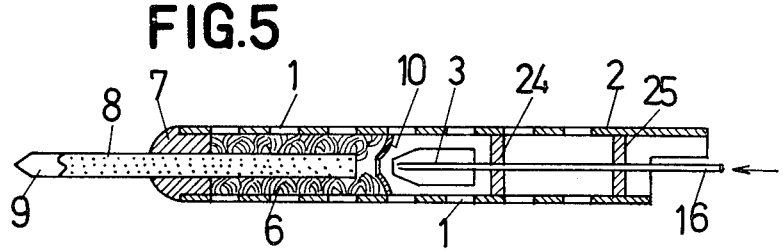
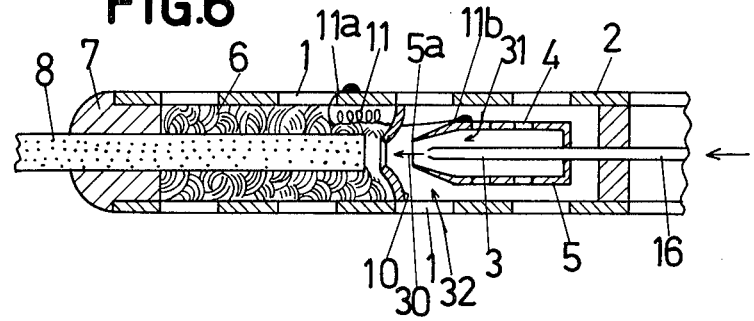
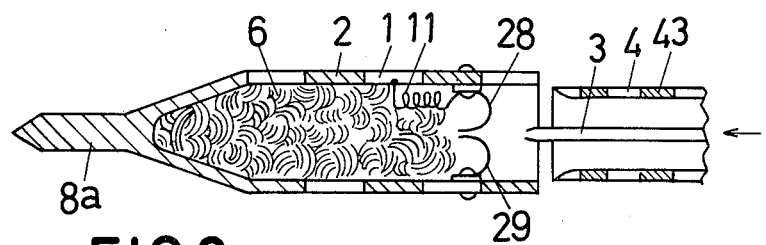
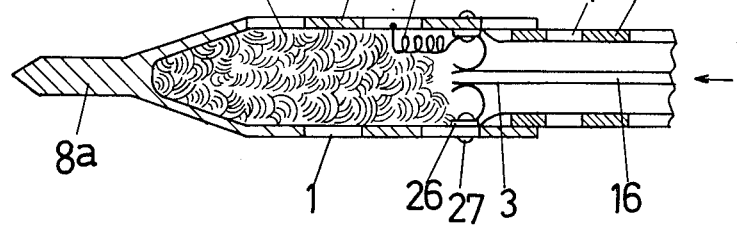

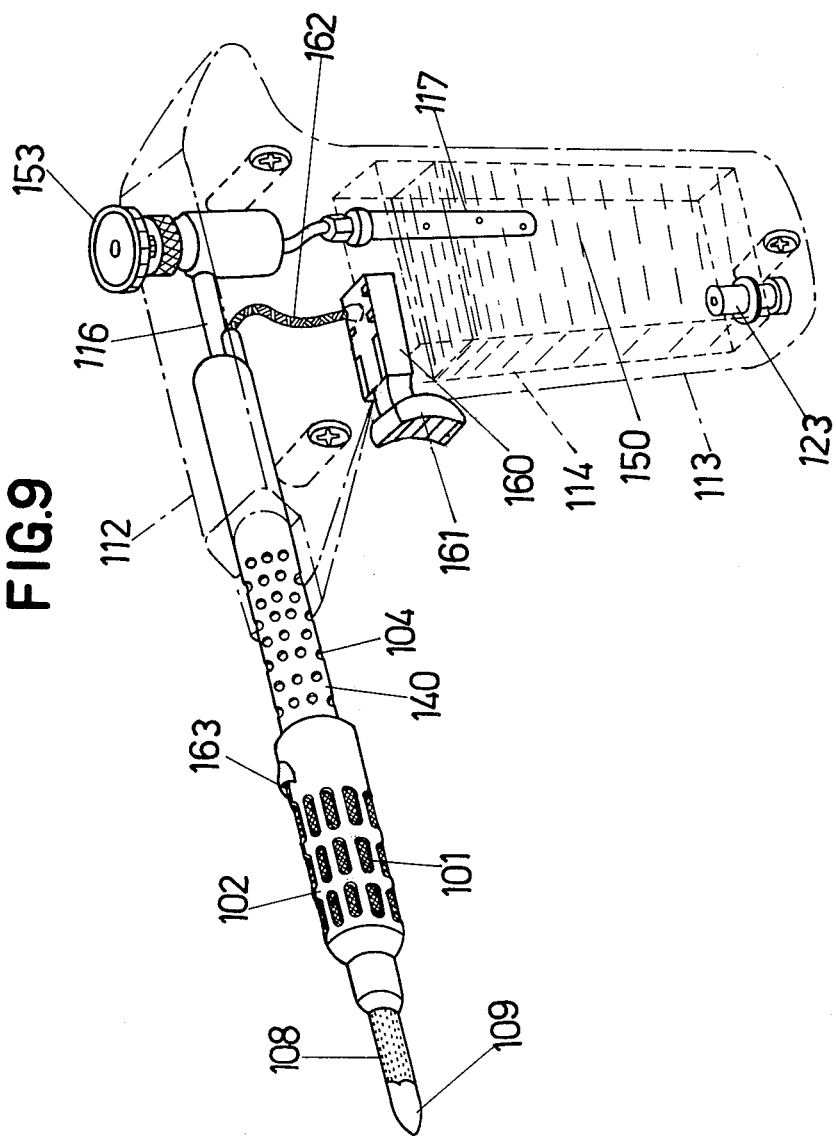

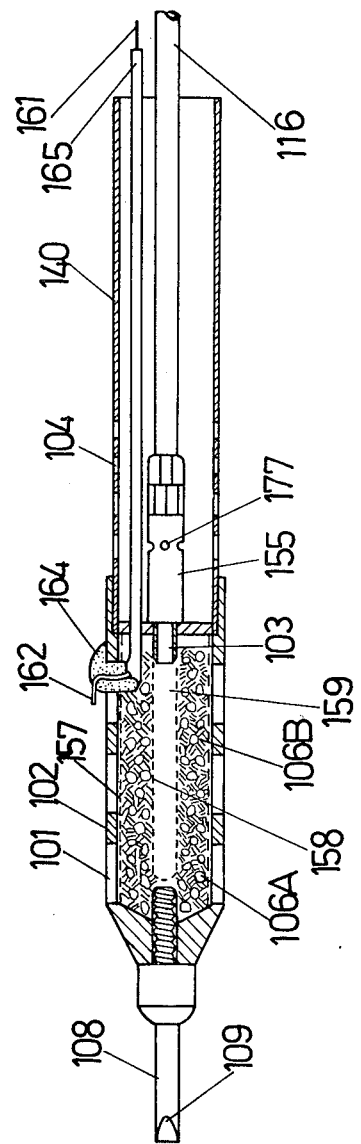
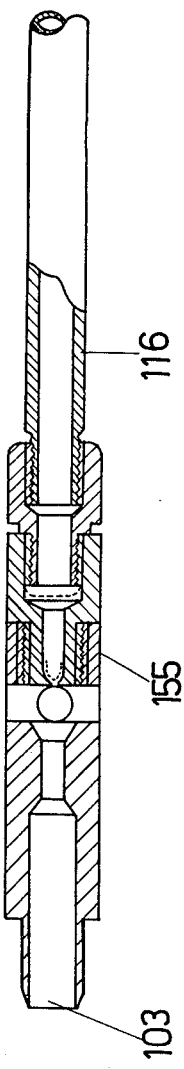
FIG.10
FIG.11

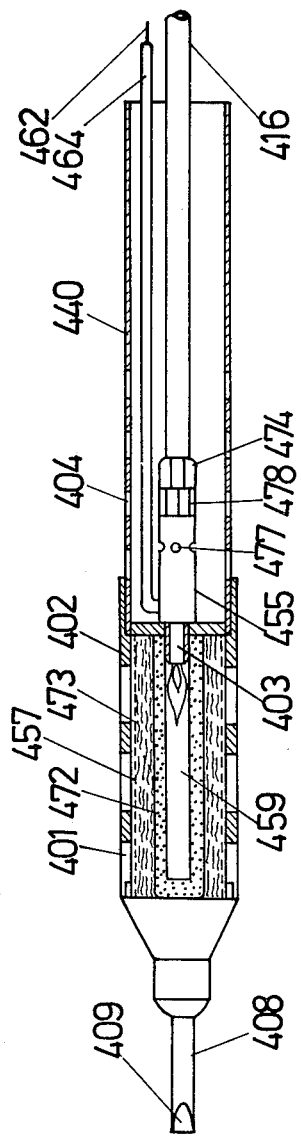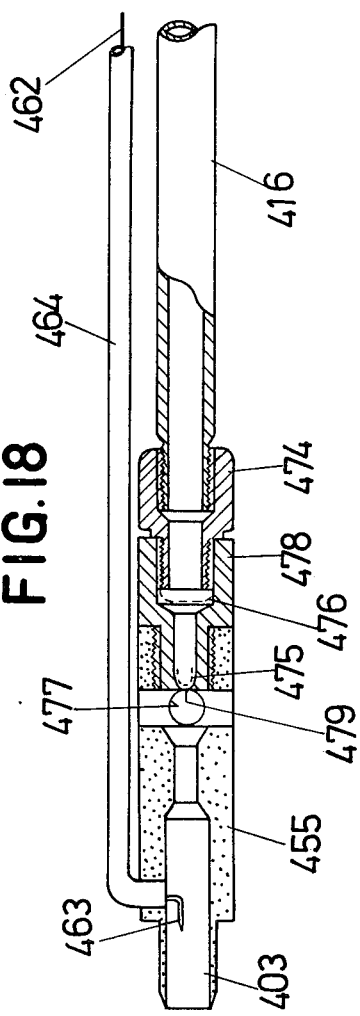

GAS HEATING METHOD AND APPARATUS

BACKGROUND OF THE INVENTION

1. Field of the Invention

This invention relates to heating method and apparatus of the type which produces heat by burning gases for the purpose of soldering or other processes, and more particularly to improved method and apparatus which permit a controlled amount of suitable liquefied gases from a gas container to be electrically ignited and burned by the oxidation reaction of catalysts in a combustion chamber to turn to flameless thermal energy which conducts through a heat conductor whose tip is thereby heated to high temperatures.

2. Description of the Prior Art

For soldering connections of electrical wires, cutting a sheet of synthetic resin and bonding two parts of synthetic resin material together, heat sources are required and heat is usually obtained from an electrical heating source. When the above soldering, cutting and other works are performed in the field, there arises at all times the need to secure any type of external electrical power sources and, for connection to any power source, a power line cord is required which prevents progress of the work, reducing the operational efficiency. Particularly, when the work is done outdoors, greater difficulties are encountered in securing the power supply and the work is made practically impossible.

In order to carry out the soldering work in places where no power supply is available, a non-electrically operated heating apparatus such as a torch lamp or blow lamp is used instead of the above electrically operated heating apparatus. When the torch lamp is used, a separate hot element or rod is required to which heat is applied by the heating apparatus for carrying out the soldering work. Alternatively, the torch lamp is equipped with a copper element at the spot from which flames are developed so that the copper element is heated under the flames. In the case of the separate hot element, the soldering work has limitations because of the limited heating capability of the hot element. In other words, it is practically impossible to apply heat to the element during the process of the soldering work while the element must be heated to a soldering temperature each time it becomes cool or less hot, thus involving discontinuity of the soldering work which results in a decreased work rate or lowered efficiency. To avoid the above, the rod element may be enlarged to a size which can contain a sufficient amount of heat for a longer lasting period, but the heat storage inherently does not last as long as it should. Then, in order to secure the capability of storing heat or to make it last much longer, it may be necessary to further increase the size at the tip of the hot element, but this may adversely affect the soldering work, making it extremely difficult or almost impossible to join relatively small connections of electrical wires or components, particularly those on a printed wiring board. If the tip is then made smaller, it cannot retain a sufficient amount of heat to keep the tip hot for a longer time. As readily understood from the foregoing, the separate hot element has a number of limitations in size and shape as well as problems in handling, resulting in limited applications or uses.

The copper element, which forms a part of the torch lamp, has also problems and disadvantages since in this case it is difficult to adjust the supplied heat to desired temperatures and it is impossible to eliminate the flames emitted from the torch lamp. When the soldering work involves joining very small parts such as on a printed wiring board, the flames may cover the parts to be joined so much that it becomes difficult to see the work. If the flames are strong and expand widely, they may cover the neighboring parts or combustible material parts which should not be heated, causing those parts to burn out accidentally. The flames of the burning parts may eventually expand over to other parts, resulting in a whole disaster, and this is not desirable from a safety aspect in addition to the technical operational aspects mentioned earlier. A different form of soldering tool heretofore known contains a secondary cell such as a nickel-cadmium cell, and is known as a cordless soldering device. This tool has a limited heating capacity so that it cannot be used continuously for a long period of time. A further disadvantage of the tool is that it takes longer to recharge the cell, and if the cell should completely be exhausted by carelessness to an extent that it can no longer discharge at all and the tool must be replaced. Thus, the cordless soldering tool has disadvantages in both economical and operational aspects. As an alternative form of soldering elements which are heated by external heating sources, such as typical torch lamps or blow lamps, there is known a heating apparatus of the type in which a gas is burned in a combustion chamber to be converted to thermal energy which conducts through a heat conductor to its tip end. This heating apparatus poses problems since it is difficult to deliver a small quantity of gas at a uniform and constant rate into a relatively small combustion chamber, and it is also impossible to prevent flames from expanding or extending out of the apparatus.

OBJECTS OF THE INVENTION

In the light of the above problems and disadvantages of the prior art and in order to eliminate the same, it is accordingly one object of the present invention to provide an improved method and apparatus for use in joining two parts of material or cutting a sheet material by application of heat. The apparatus includes a layer or layers of oxidation reaction promoting catalysts in a combustion chamber which promote the burning of a flow of liquefied gas in complete and flameless combustion to convert the burned gas to thermal energy which conducts through a heat conductor to its tip end, thereby permitting lasting and safe heat treatment.

Another object of the present invention is to provide improved method and apparatus whereby the burning of a flow of gas is triggered electrically or piezoelectrically.

Still another object of the present invention is to provide an improved method of and apparatus for heating a material for soldering, disoldering, bonding and cutting processes wherein the burning promoters include a mixture of two different catalyst carriers disposed in a combustion chamber, one comprising quick combustion promoting and high heat-resistant substances and the other comprising retarded combustion promoting and good heat-conducting substances, thus permitting the gas burning to last longer and produce a high temperature heat.

A further object of the present invention is to provide improved heating method and apparatus, the apparatus having a triggerable gun or pen form which allows it to be manipulated with ease for soldering and other purposes.

A further object of the present invention is to provide an improved heating method and apparatus wherein the burning of a flow of gas is accomplished in two stages, which permits a complete combustion of the gas.

A further object of the present invention is to provide an improved heating method and apparatus wherein the gases to be burned are usually liquefied gases contained in a rechargeable container such as petroleum gas, natural gas and other similar gases.

Features and advantages of the present invention include easy burning of a flow of gas adjustably fed from a rechargeable gas container, which flameless burning is triggered by electrical or piezoelectrical means, and high temperature heating which is concentrated on the tip of the heat conductor, with a minimum charge of gas producing a maximum amount of long lasting heat energy.

BRIEF DESCRIPTION OF THE DRAWINGS

Other objects, features and advantages of the present invention will become apparent and readily understood from the following detailed description of the specification and appended claims by reference to the accompanying drawings, in which:

FIG. 1 is a perspective view of a heating apparatus embodying the present invention with the grip portions indicated by broken lines;

FIG. 2 is a front view of FIG. 1;

FIG. 3 is a front view of a varied form of the apparatus in FIG. 1.

FIG. 4 is a front view of a further varied form of the apparatus, having a connecting portion at the bottom of the grip which leads to an external gas supply source;

FIGS. 5 to 8 illustrate the sectional views of varied forms of the gas combustion portion for use in the varied apparatus in FIGS. 1 to 4, in which FIG. 6 is a partially sectional enlarged view of FIG. 5. FIG. 8 shows that the outlet nozzle is placed in a position which closes the ignition heater circuit, from the position in FIG. 7;

FIG. 9 is a perspective view of a varied form of the apparatus embodying the present invention;

FIG. 10 is an enlarged sectional view of a varied form of the combustion portion having a mixture of two different catalyzers;

FIG. 11 is an enlarged sectional view of an air-gas mixing means in FIG. 10;

FIG. 17 is a sectional view of a varied form of the combustion portion; and

FIG. 18 is a fragmentary enlarged sectional view of FIG. 17, showing details of the mixing portion.

DESCRIPTION OF THE PREFERRED EMBODIMENTS

Figure 12:
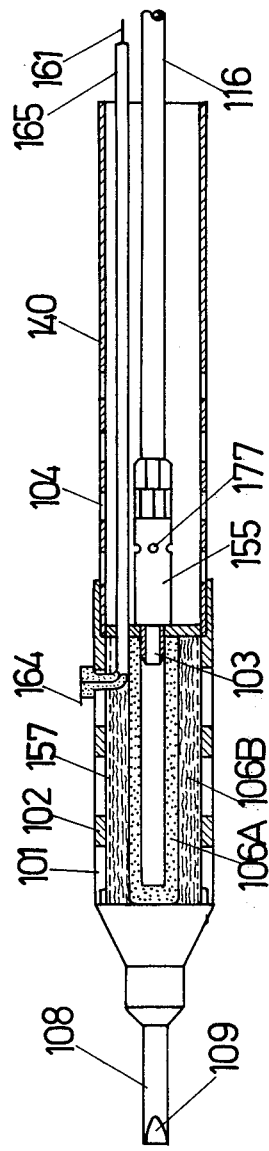
FIG. 12 is a sectional view of a further varied form of the combustion portion having two layered different catalyzers.

FIG. 1 is a schematic illustrative view of the one form of heating apparatus according to the invention, having generally a gun form, and FIGS. 2 to 4 illustrate variations of the heating apparatus. In FIGS. 5 and 6, an example of a hollow cylindrical combustion portion 2 is shown which has a plurality of air holes 1 spaced at regular intervals longitudinally around the peripheral wall thereof, and a gas jet nozzle pipe 3 therein extending centrally from one end thereof. The gas jet pipe 3 has an end portion enclosed with a manifold casing 5 having a plurality of air holes 4 thereon and which fits on the pipe 3. The combustion portion 2 includes at the other end portion thereof a layered oxidation reaction promoting catalyst 6 therein which will be described later, and has an opening closed by a plug 7 at the tip end. The plug 7 has an opening through which a heat conductor rod 8 passes, extending through the layered catalyst 6. The conductor rod 8 has a heat treating portion 9 at its tip end. The combustion portion 2 has a stopper 10 located inside near the end of the layered catalyst 6, the stopper 10 having an aperture to guide a jet of gas from the pipe 3 through the aperture into the catalyst layer 6 at a uniform and constant rate and protecting said end of the catalyst 6. The catalyst layer 6 has a hot wire 11 embedded therein, and the wire 11 has one end 11a fixed to the wall of the combustion portion 2 and the other end 11b fixed to the outer wall of the manifold case, thus forming a part of ignition heater circuit. In accordance with the construction of the apparatus illustrated above, a heater push button 22 is depressed, causing the heater circuit to be closed and thus causing the hot wire to become hot to a temperature which ignites a jet of gas from the pipe 3 for burning. As shown in FIG. 1, the combustion portion 2 has a barrel form, for example, and has its one end removable to fit in the casing 12 shown by broken lines, the casing 12 being formed of heat-resistant synthetic resin materials such as polycarbonate, Bakelite (Trademark), uric synthetic resins and like. The heating apparatus further includes a grip portion 13 shown by broken lines in FIG. 1, the grip portion 13 containing a rechargeable gas container 14 therein. The gas container 14 leads to the gas jet pipe 3 by way of a gas pipe 16 and a flexible pipe 15, the gas pipe 16 having a connection to a liquid absorbing, porous gas introduction hose 17 of foam cellulose or foam polyethylene material. As shown by broken lines, the hose 17 extends near the bottom of the gas container 14. In the drawing, numeral 18 denotes a gas flow regulator; 19, a gas inlet at the bottom of the container 14; numeral 20, a power supply or dry cell such as a secondary nickel-cadmium cell as shown; 21, a cap closing an opening of the casing 12 through which the cell can be placed in position or removed; 23, a gas check valve; and 24 and 25 are members supporting the gas jet pipe 3 therethrough. A varied form of the combustion portion shown in FIGS. 5 and 6 is shown in FIGS. 7 and 8, in which a heat conductor rod 8a forms an integral part of the combustion portion 2 as shown. In this manner, heat produced by burning a gas in the combustion chamber portion 2 can readily conduct through the chamber wall to the conductor rod 8a. As shown in FIGS. 7 and 8, a hot wire 11 has one end (which corresponds to that shown at 11a in FIG. 6) fixed to the chamber wall, and has the other end (11b) connected to one elastic conducting plate 28 which forms a bend, both being fixed together to the inside wall of the chamber 2. The elastic plate 28 is made of phosphor bronze or stainless steel. A further elastic conducting plate 29 of the same material as the plate 28 forming a bend has one end fixed to the inside wall of the chamber 2 and has the other end normally spaced away from the opposite end of the plate 28, defining a gap through which the tip end of the gas jet pipe 3 is inserted. As readily understood, when the pipe 3 is moved inside, its tip end makes contact with the opposite elastic plates 28 and 29, thus completing the heater circuit. In the embodiments described by reference to FIGS. 5 to 8, the combustion chamber portion 2 is made of thin-gauge iron base plate having a hollow cylindrical form, the wall surfaces of which are coated with nickel or chrome plating for anti-corrosion treatment. As already mentioned, the chamber 2 has a number of perforations 1 on the peripheral wall which serve as air holes through which the burned gas is exhausted while fresh air is fed. The air holes 1 also serve to prevent the produced heat from conducting or escaping toward the portions or the side of the heat-insulating casing 12 which should not be heated, thus making it possible to increase the required heating efficiency to a maximum. The hot wire or filament 11 earlier mentioned is made of per se known coiled Nichrome or platinum wire, and is energized to become hot when it is connected to the power supply or dry cell by closing the heater circuit. The hot wire ignites a gas whose burning is promoted at its start by the oxidation reaction promoting action of the catalyst. In the varied form in FIGS. 7 and 8, the combustion chamber portion 2 has a wall base of copper or copper alloy, the surfaces of which have an iron or nickel plated coating. It should be noted that the tip of the conductor rod 8a has a soldered finish. In the drawing, 26 denotes a heat resistant insulating packing such as of asbestos or mica, 27, a rivet, and 43, an insulating cover.

The oxidation reaction promoting catalyst for use with the embodiments described heretofore comprises a base of asbestos to which 20cc hydrochloric acid solution containing 0.5g. hexachloroplatinic acid $H_2(PtCl_6)$ is sprayed such that it can uniformly adhere to the asbestos base. After drying, the thus obtained product is reduced by hydrogen at temperatures of 200° C to 250° C. Alternatively, the catalyst may be prepared by immersing a paste base of refined asbestos, glastex, pumice stone or porous alumina into a solution of hexachloroplatinic acid and then a solution of heavy-duty concentrated ammonium chloride, and then by applying high temperature heat to the product. The catalyst thus prepared as mentioned above may contain by weight a ratio of 0.1% to 10% of platinum to the catalyst carrier substance. When butane is used as a liquefied fuel, 0.1% to 1% content of platinum may promote the burning of gas satisfactorily, but in order to give the catalyst a longer life and a better efficiency of burning promotion, it is preferable that the catalyst contain 5% to 10% of platinum. The essential thing to be noted is to provide a gas mixture of such a ratio of fuel gas to air as to permit a complete combustion of the mixture gas and then to deliver it to and through the layered catalyst in a uniformly diffused manner. For this purpose, the carrier which contains the catalyst must be porous. In this respect, glastex acts well as a catalyst carrier though it is less resistant to high temperatures. When the apparatus is specifically used for soldering, it is noted that glastex has no particular problem as a carrier. When asbestos is employed as a carrier, it has no problem in respect to the resistance to high temperatures though there is a problem in making it uniformly porous. Porous alumina or pumice can provide a good carrier, depending on the manner of manufacture. However, it turns out to be improper if it is disposed in a relatively limited space, because of its lower efficiency of combustion promotion. Paradium may be employed as a catalyst in place of platinum, but presents a problem in respect to its efficiency and life. The carriers of different materials and catalysts of various materials have been mentioned, and those have possibilities of being employed, depending on the use or purpose of the apparatus. Referring back to FIGS. 2 to 4 showing the varied forms of the apparatus, the apparatus in FIG. 2 includes a transparent grooved viewfinder 37 which shows a level of liquefied gas in the gas container 14. FIG. 3 shows an apparatus of reduced dimensions containing no heater means to permit the ignition of a gas to be triggered. In this case, a gas is ignited by external ignition means such as a match or a lighter. Reference numeral 33 denotes heat resistant packing; 34, a gas flow regulating lever; 35, a grip casing in which a gas container is disposed; and 36, a transparent grooved viewfinder. In FIG. 4, the apparatus includes a hose connector 39 at bottom of the grip 13 from which a flexible hose 38 extends toward an external large-capacity gas container not shown. Thus, the apparatus in FIG. 4 permits a long time, continuous operation. In FIG. 4, numeral 40 denotes an apertured tubular cover having regularly spaced air holes which is interposed between the combustion chamber portion 41 and the grip casing 13 for their connection. As shown, the conductor rod 42 forms an integral part of the combustion chamber 41.

The operation of the varied embodiments illustrated in the foregoing will now be described below.

In FIG. 1, for operation, turning the gas flow regulating handle 18 to open the gas passage to a desired degree causes a regulated amount of liquefied gas to be suctioned into the porous hose 17 in which the gas changes to a vaporized state, passing through the gas pipe 16 and flexible pipe 15 to the gas jet pipe 3 from which it is jetted and sprayed into the combustion chamber 2 as indicated by arrow 30 in FIG. 6. As the jet of gas from the pipe 3 is entering the combustion chamber 2, it is mixed at the outlet 59 of the manifold case 5 with fresh air which is introduced through the air holes 4 of the manifold case 5 as indicated by arrow 31, the air-gas mixture thus produced further being mixed with fresh air introduced through air holes 1 as indicated by arrow 32 and flowing under suction into the catalyst layer 6. Triggering or depressing the heater button 22 at this moment causes the heater circuit to be closed so that current from the power source or dry cell 20 shown can flow in the heater coil 11 which becomes hot or incandescent, igniting the air-gas mixture for flamelessly burning the gas content under the oxidation promotion action of the catalyst. The flameless burning of the gas will not be extinguished by a blow of wind, which may otherwise influence the condition of burning, allowing the gas to keep on burning without discontinuity which permits an uninterrupted use of the apparatus. Referring next to FIGS. 9 to 12, further varied forms of the invention will be illustrated in detail. The heating apparatus shown in FIG. 9 has generally the gun form including a heat-insulated body casing 112 with a grip 113 shown by broken lines, an intermediate tubular connector 140 having a number of air holes 104 thereon and having one end insertable inside the casing 112, and a tubular combustion chamber 102 having a plurality of regularly spaced elongated apertures 101 for air passage connected to the other end of the connector 140. The combustion chamber 102 contains dually composed catalyst carriers 106 carrying catalysts composed of substances which will be described later. The dually composed carriers 106 consist essentially of a carrier 106B of fibrous ceramics or asbestos and a carrier 106A of porous ceramics, which are prepared by mixing a predetermined ratio of those two materials together, the mixture carriers containing the catalyst substances of the later described composition and being disposed inside the combustion chamber 102 as shown. A hot conductor rod 108 extends from the combustion chamber 102. The casing 112 shown by broken lines includes a body and a grip 113 as mentioned above, the grip portion 113 having a gas tank 114 therein which contains a liquefied gas 150. A separator 117 is shown which separates the gas 150 to form a vaporized gaseous state which is introduced into a needle valve 153, the needle valve 153 adjustably controlling the flow rate of the gas. The amount of the gas controlled by the valve 153 is then introduced by way of a gas inlet pipe 116 into a mixing portion 155 disposed inside the apertured connector 116. The mixing portion 155 mixes the gas with fresh air introduced through the air holes 104 and has an outlet or nozzle 103 from which a jet of the air-gas mixture is sprayed into the combustion chamber 102. The catalyst carrier 106 in the combustion chamber 102 are enclosed by an outer net 157 and an inner net 158 both of a heat resistant metallic material which are formed to a tubular shape having one end closed and having a central hollow passage 159 to which the outlet 103 of the mixing portion 155 is exposed. Thus, a jet of the air-gas mixture is introduced into the combustion chamber 102 where the gas reacts uniformly with all the catalysts. As particularly shown in FIG. 9, a cased piezoelectric element 160 is mounted on the casing 112 which is actuated by a trigger 161 for producing a voltage. The voltage developed at the element 160 is applied across the heater circuit, and current flows through a lead line 162 to an ignition plug 163 partly exposed from the combustion chamber 102. More specifically, the lead line 162 and ignition plug 163 are enveloped with insulating material 164 and insulating tube 165, respectively, which electrically insulate the respective lead line 162 and plug 163 from the combustion chamber 102 and connecting pipe 140.

Now, the catalyst carriers for use with varied forms shown FIGS. 9 to 14 consisting essentially of two different carriers 106A and 106B, generally shown at 106 will be described below in detail. One carrier 106B comprises high heat-resistant and quick combustion reaction promoting fibrous or downy silica-alumina group ceramics such as Fineflex 1300 or 1500 (trade-name) manufactured by Nippon Asbestos Co., Ltd., which contain any of the catalyzer substances of platinum group. The catalyzer substance contained in this carrier 106B has the property of promoting the ignition of a jet of gas to burn by means of its combustion-reaction promoting capability when only electrical sparks jump. The carrier 106B is prepared in the following manner.

For example, a catalyzer compound in a liquid form comprises 20cc of hydrochloric acid solution containing 1g of hexachlorole platinum acid ($H_2P_tCl_6 \cdot 6H_2O$) and 1% or less of fluorides in a proportion to the above solution, such as hydrofluoric acid or acid ammon fluoride which are added to the above solution in order to better fix the catalyzer and increase the catalyzer activation. The catalyzer compound thus produced is then sprayed to a catalyzer carrier such as 100g of fibrous ceramics of alumina platinum so that the former can adhere or be bonded together to the latter as uniformly as possible, and the resulting product is dried rapidly.

The addition of the fluoride substances is to make the catalyzer easier to fix so as to avoid corrosion of the ceramics fibers which makes the surface of the fibers rough. Too much fluoride makes the ceramics fibers fall to pieces, and eventually dissolve in the fluoride. It is actually shown that as much as 0.1% of added fluoride can satisfactorily meet the objects of the invention. The fibrous ceramics thus dried containing platinum acid is then reduced by hydrogen at temperatures of 200° C to 250° C, but may be baked in the atmospheric air at 500° C or more which is advantageous because the fluoride residue can be expelled quickly and completely.

The other carrier 106A carries a catalyzer compound of substances which are thermally conducting and retard the combustion reaction at start but promote the reaction as the temperature rises. The catalyzer carrier 106A comprises porous ceramics or porous cermets such as porous silica alumina and porous alumina containing a catalyzer compound of the platinum group. The combination process of those two kinds of substances is carried out like in the carrier 106B, except that in this case the carrier 106A should preferably be immersed in the solution of catalyzer or immersed under vacuum, instead of the spraying method earlier mentioned.

In the embodiment shown in FIGS. 9 to 14, opening the needle valve 153 to a desired degree causes a flow of liquefied gas 150 therethrough to the separator 117 from which a vaporized state of gas flows to the mixing portion 155 where it is mixed with fresh air through air holes 104, the air-gas mixture being then jetted from the outlet 163 into the combustion chamber 102. At this moment, depressing the trigger 161 actuates the piezoelectric element 160 to develop a voltage across the ignition heater circuit, the current from the piezoelectric element 160 jumping electrical sparks between the ignition plug 163 and the combustion chamber 162. The sparks thus jumped ignite the air-gas mixture on the instant under the oxidation reaction promoted by the catalyzer carrier 106B of the quick combustion promoting character in the chamber 102. The heat produced by burning the gas conducts through the rod 108 to its tip 146, while the carrier 106A in the chamber 102 can help the tip 146 to be further heated to a sufficient temperature for soldering, for example. As the temperature in the chamber 102 rises, the catalyzer in the carrier 106A contributes to the further burning of the gas to higher temperatures. Even though there is a temperature rise in the chamber 102, on the other hand, the heat-resistant catalyzer in the carrier 106B can make the surroundings resist or protected from the rising temperature heat, allowing the combustion reaction promoting catalyzers to be maintained in service for a longer time. In accordance with the embodiment in FIGS. 10 and 11, the temperature of heat produced can reach maximum 420° C while the earlier embodiments in FIGS. 5 to 8 using asbestos in the catalyzer carrier produce heat of approx. 320° C, given the same conditions such as the construction of the combustion chamber and the amount of gas to be consumed.

Figure 14:
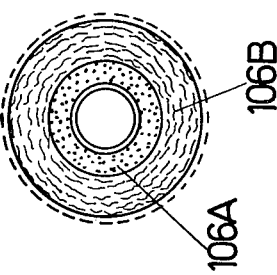
FIG. 14 is an enlarged transverse sectional view of FIG. 12.
Figure 13:
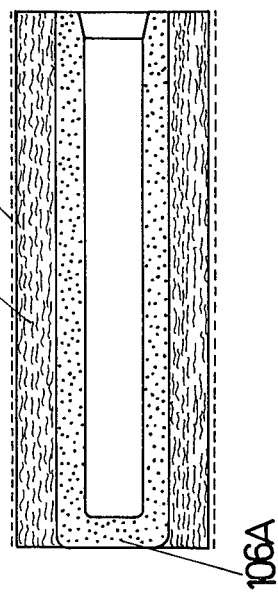
FIG. 13 is an enlarged vertical longitudinal sectional view of FIG. 12.

A further varied form of the combustion chamber used with the apparatus shown in FIG. 9 is shown in FIGS. 12 to 14. This varied form is advantageous with respect to keeping the catalyzer carriers arranged in proper layers in the combustion chamber regardless of the period during which the apparatus is actually used.

The embodiment in FIGS. 10 and 11 is particularly advantageous with respect to the oxidation combustion reaction initially promoted by the catalyzers, heat resistance of the carriers and heat conductivity, and the two kinds of carriers each containing different catalytic substances are mixed together. However, this arrangement in FIGS. 10 and 11 tends to become disordered in the chamber during long service, thus presenting some problems in that an unburned portion of the gas escapes through the combustion chamber and the temperature distribution in the chamber becomes uneven. Disposing the carriers in appropriate positions in the chamber may be somewhat difficult. The varied form in FIGS. 12 to 14 is improved in those respects and has a generally similar construction to that in FIGS. 10 and 11, with the catalyzer carriers differently arranged in the combustion chamber. As shown in FIG. 12, a combustion chamber 102 has therein disposed a tubular porous ceramics carrier 106A closed at one end over which a fibrous ceramics or asbestos carrier 106B is superposed to envelope, those carriers 106A and 106B each carry the catalyzers whose compositions have hereinbefore been described. As shown, a net of a heat-resistant metallic material 157 encloses the two-layered catalyzer carriers. The carrier 106B has retarded oxidation reaction promoting and good heat conducting properties, comprising 50 to 60 mesh sizes of milled grains or globular grains of corundum, carborundum or mullite beads containing a binder. These grains or beads are formed by baking at 1300° C to 1500° C to the tubular shape shown having pores therein of about 100 microns in diameter. There are several methods of combining the carrier material 106A with catalytic substances, some of which are described below. In one method, the formed carrier is immersed in a aqueous solution which is prepared by adding 1% hexachlorole platinum acid ($H_2PtCl_6$ $6H_2O$) to 3 to 4% solution of hydrofluoric acid, forming a platinum group catalyzer. Then, the solution is excluded from the immersed carrier, which in turn is dried at about 120° C and is then either baked for about three hours at 500° C to 550° C or baked at 250° C to 270° C in a hydrogen reducing furnace. The thus produced carrier contains by weight a proportion of 0.3% to 0.8% of platinum to the carrier proper. The minimum content of 0.3% of platinum can also promote the oxidation reaction.

In a second method, the formed carrier is kept heated to 300° C to 600° C, which is immersed for a short period in an aqueous solution containing 5% hydrofluoric acid and hexachlorole platinum acid ($H_2PtCl$ $6H_2O$), and is at once excluded from the solution and again immersed, the operation being repeated several times. The carrier thus-obtained contains by weight a proportion of over 1% of platinum to the carrier proper.

In a third, the formed carrier is immersed in 1000cc aqueous solution containing 100g methavanadic acid ammonium (($NH_4$) $VO_3$) and a small quantity of ammonia water ($NH_4OH$), and after being dried is then baked at 500° C. Other subsequent procedures are followed as in the first method. Instead of the methavanadic acid ammonium mentioned above, tungsten acid ammon ($NH_4$)$_6$$W_7O_{17}$ or nitric acid cerium $Ce(Ne_3)_3.6H_2O$ may be used. If nitric acid cerium is chosen, the formed carrier is immersed in an aqueous solution of nitric acid cerium, which is then baked at 500° C or above after being dried. In this case, the catalyzer contained in the carrier can have the action of cerium oxide. If the formed carrier contains catalyzer substances other than those of the platinum group, such as oxides of cerium, vanadium and tungsten, and then contains the catalyzer substances of the platinum group mentioned earlier, the carrier of the thus resultant composition is capable of resisting the toxicity of the catalyzer substances and making the catalyzer substances have a longer life.

The catalyzer carrier 106B comprises ceramics or asbestos in fiber, downy or cloth form which has the quick combustion reaction promoting and high heat-resistant characteristics, and contains catalyzer substances of the compositions described in the earlier embodiments of FIGS. 10 and 11.

In accordance with the embodiment in FIGS. 12 to 14, the trigger 161 is operated for closing the heater circuit so that electrical sparks can jump between the ignition plug 163 and combustion chamber housing 102. This causes the combustion reaction to be initially promoted by the catalyzer carrier 106A while causing the combustion reaction thereafter to be promoted by the carrier 106B in which there is a rise in temperature. As mentioned above, carrier 106A has the good heat conducting properties while the carrier 106B has high heat resistant properties. Thus, the different properties of the two carriers provides a high burning efficiency in the combustion chamber 102, which can make the soldering iron tip 109 heated to sufficient temperatures for e.g. soldering.

The construction of the carrier 106A baked to the cylindrical shape permits mass production as well as uniform quality of the apparatus according to the invention.

It should be noted that the carrier 106A may contain, in addition to the substances referred to above, other substances such as aluminum, beryllium, zirconium, thorium, cerium, magnesium, silicone, boron, chromium, tungsten, titanium, stainless steel or oxides thereof, or mixtures, compounds or combinations of two or more thereof, or baked or sintered forms thereof, or carbon compounds or boron compounds or mixtures, compounds, baked or sintered forms thereof which may have fibrous, downy or mesh forms, or the grain, globular or porous forms thereof may suit the purposes of the invention.

Figure 15:
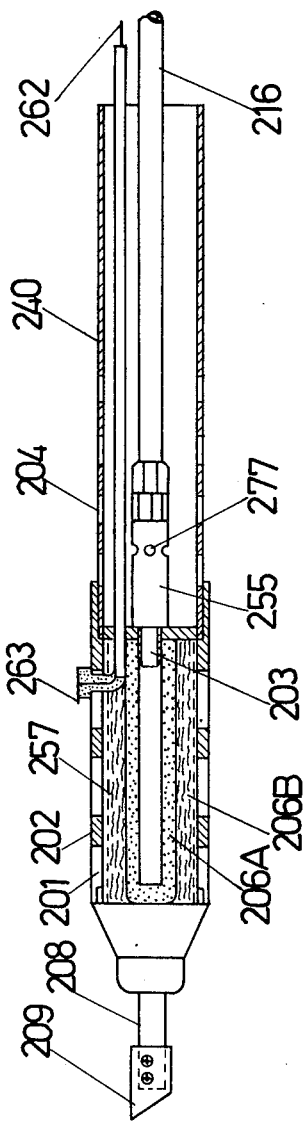
FIG. 15 is a sectional view of a further varied form of the combustion portion.

A varied form of the combustion chamber in FIG. 15 has substantially the same construction as that in FIG. 12, and corresponding parts have corresponding reference numerals but have been increased by one hundred in FIG. 15 for clarity of understanding. Therefore, it should be noted that the catalyzer carrier layers in the combustion chamber are constructed similar to those in FIG. 12, and the heat generation and conduction are accomplished in the same manner. As particularly shown in FIG. 15, an iron tip 209 having a different purpose is mounted to a heat conductor rod 208. The iron tip 209 has the function of cutting a sheet into two parts, when heat produced in the combustion chamber 202 conducts through the rod 208 to heat the tip 209. Reference numeral 255 denotes a mixing portion, 277, air hole and other parts corresponding to those in FIG. 10.

Figure 16:
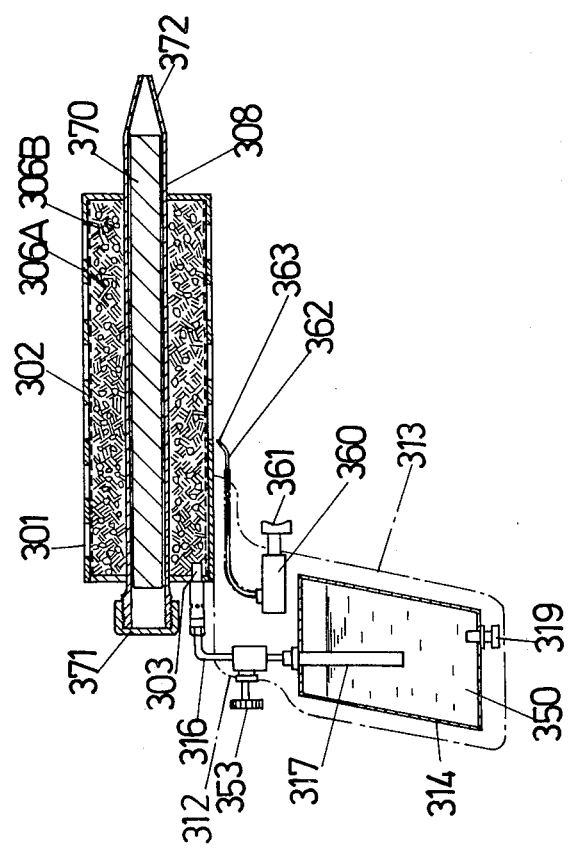
FIG. 16 is a front view of a varied form of the heating apparatus.

A further preferred embodiment of the heating apparatus is shown in FIG. 16. As shown in FIG. 16, the apparatus has the gun shape comprising essentially two parts such as the grip portion 313 and the combustion chamber portion 302. The grip portion 313 contains a gas container 314 therein from which a flow of gas 350 is suctioned by way of an immersed pipe 317 and a needle valve 353 into the combustion chamber 302.

The combustion chamber 302 mounted on the grip portion 313 contains a mixture of two kinds of catalyzer carriers 306A and 306B described hereinbefore, through which a tubular heat conductor 308 having a tapered end is mounted. The heat conductor 308 contains a rod-like adhesive material 370 and has also a capped end 371 through which adhesive rod 370 is charged into the hollow conductor 308. The grip portion 313 further has a triggerable piezoelectric element 359 from which leads 362 extend as shown. As readily understood from the construction above illustrated, the apparatus in FIG. 16 has the function of bonding two parts of material together by feeding an adhesive which is melted under heat. In operation, the needle valve 353 is adjustably opened so as to supply a flow of liquefied gas 350 from the container 314, which changes to a vaporized state and flows into a mixture of the catalyzer carriers shown, while the piezoelectric element 360 is triggered, across which a voltage is developed with a current flow through leads 362, thereby making electrical sparks jump across the plug 363. Thus, the gas in the combustion chamber 302 is ignited for flameless burning under the combustion reaction promoted by the catalyzers. The heat produced in the chamber 302 conducts through the conductor 308, permitting the solid adhesive 370 to melt under heat and flow through the opening 309 of the tapered end 372 of the conductor 308. A further varied form of the combustion portion is shown in FIGS. 17 and 18. In FIG. 17, the combustion portion includes a combustion chamber 402 and a supporting pipe 440 connected to the chamber 402, the chamber 402 containing disposed axially thereof a cylindrically shaped layer of a catalyzer carrier 406A of an electrically conductive material such as porous cermet, closed at one end and surrounded by a catalyzer carrier 406B of fibrous ceramics or asbestos, and the supporting pipe 440 containing a mixing portion 455 which provides a mixture of a gas from a gas introduction pipe 416 and fresh air through air holes 404 and 477 to the central opening of the carrier 406A through a jet outlet 456. The catalyzer carrier 406B is enclosed by an outer net 457 of heat-resisting metallic material. FIG. 18 indicates the mixing portion 455 on an enlarged scale in which through the exposed wall of the mixing portion 455 is an ignition plug 463 which leads by way of leads 462 electrically insulated by sheath pipe 465 to a power supply which is not shown. As particularly shown in FIG. 18 the mixing portion 455 is disposed nearer to the combustion chamber 402 within the supporting pipe 440, and is connected by means of connector 474 to the gas introduction pipe 416 which extends though a gas nozzle 478 to the inlet of the mixing portion 455. The gas nozzle 478 has filtering nets 474 and 475 disposed at two locations as shown, and has a very small opening 479 at the outlet thereof.

The mixing portion 455 has on the wall a plurality of air holes 477 already mentioned which permit pressure at 477 to be reduced as a jet of gas is forced out at high speeds through the outlet 479, thus introducing, under suction, fresh air through air holes 404 and 477 into the mixing portion 455 where the jet of gas and fresh air can be mixed together. In the embodiment in FIG. 17 and 18, as the amount of fresh air introduced through other than the air holes 477 is very small, the air holes should preferably be enlarged while the outlet 479 may be smaller in diameter, thus permitting an amount of air greater than that required for burning the gas to be introduced. The compositions of the carriers 406A and 406B each carrying catalyzers of different properties are similar to those in the earlier embodiments.

In operation, a flow of gas from the gas source 414 is introduced by way of the gas introduction pipe 416 into the mixing portion 455 where the gas and air is mixed together to form a predetermined ratio of air-gas mixture which is jetted out through the outlet 456 into the central hollow 459 while a power supply such as piezoelectric element is triggered developing a voltage which jumps sparks across the spark plug 463. The sparks ignite the mixture for burning within the central hollow 459, this burning being referred to herein as primary combustion. The burned portion and unburned portion of the mixture during the primary combustion flow through the catalyzer carrier layers, and burning of the unburned portion is promoted by contact with the catalyzers contained in those layers. This burning is referred to herein as secondary combustion. All burned gases during the secondary combustion are emitted out through holes 401 to the atmosphere. As readily understood from the above, the primary combustion of the gas takes place in the central hollow of the combustion chamber 402, and the heat produced thereby can be held within the chamber 402 and kept at a high temperature. The inherent heat conductivity of the porous cermet 472 can readily make the produced heat conduct through the rod conductor 408 to its soldering tip 409 which can readily be heated to high service temperatures, as soon as the gas ignition takes place in the combustion chamber. The portion of the air-gas mixture left unburned during the primary combustion can be forced into the outer catalyzer carrier layer where that portion can burn completely during the secondary combustion, without any flame out of the combustion chamber 402. In the embodiment of FIGS. 17 and 18 it has been described that the primary combustion takes place in the central hollow 459, but alternatively, the combustion may be made to take place in any porous material which contains no catalyzer substances. In place of igniting the fuel gas by means of the electrical sparks described above, the gas may be ignited by the heater element described in the earlier embodiments.

The present invention has hereinbefore been illustrated by showing the various forms of the heating apparatus. It should particularly be noted that, as mentioned earlier, the apparatus may be used for heating applications such as soldering, desoldering, bonding, cutting and similar operations under application of the heat produced, by changing the shape of the conductor tip depending on which applicaton is employed. The varied shaped of the tip is an integral part of the apparatus and therefore falls within the scope of the invention. The gases described have been in liquefied form, such as liquefied petroleum oil gas, natural gas and other fuel gases, but the form of those fuel gases include a vaporized gas and other any form of gas.

Although the invention has been illustrated by way of examples only, it should be understood that various changes and modifications may be made without departing from the spirit and scope of the invention.

What is claimed is:

1. Heating apparatus of the type in which heat is produced by burning a mixture of air and fuel gas in a combustion chamber, the apparatus comprising:

a heat insulating casing holdable by hand;

a rechargeable gas container disposed in said casing for containing an amount of liquefied fuel gas;

a gas introduction passage having one end immersed in said gas container and the other end extending to later-mentioned air-gas mixing means, said other end having a gas outlet nozzle;

gas-flow adjusting means interposed in said gas introduction passage for feeding an adjusted amount of gas under suction from said gas container;

gas vaporizing means interposed in said gas introduction passage for feeding a vaporized state gas to later-mentioned air-gas mixing means;

air-gas mixing means for mixing said vaporized gas from said gas vaporizing means with fresh air from the atmosphere, said air-gas mixing means having an outlet nozzle from which a jet of air-gas mixture is supplied and having air inlet aperture therein;

a combustion chamber extending from said casing and having apertures on the periphery thereof, for having an introduction of said jet of air-gas mixture therein, said combustion chamber including two carriers carrying catalyzing substances of different character disposed therein for promoting the oxidation reaction of said jet of air-gas mixture;

a heat conducting rod extending from said combustion chamber having a heating tip at one end; and ignition circuit means for igniting said jet of air-gas mixture in said combustion chamber, said ignition means including electrical power source, ignition means and means for selectively closing said ignitiion circuit means for connecting said power source and ignition means.

2. Heating apparatus as defined in claim 1, wherein said two catalyzer carriers comprise a first carrier containing quick combustion promoting, heat-resistant catalyzing substances and a second carrier containing retarded combustion promoting, heat-conducting catalyzing substances.

3. Heating apparatus as defined in claim 2, wherein one of said two carriers comprises fibrous material containing catalyzer substances heated to a shape and disposed in said combustion chamber.

4. Heating apparatus as defined in claim 2, wherein said first carrier comprises a fibrous material and said second carrier comprises a porous material.

5. Heating apparatus as defined in claim 4, wherein said fibrous material is a fibrous ceramics.

6. Heating apparatus as defined in claim 4, wherein said fibrous material is an asbestos.

7. Heating apparatus as defined in claim 4, wherein said porous material is a porous ceramics.

8. Heating apparatus as defined in claim 4, wherein said porous material is a porous silica alumina.

9. Heating apparatus as defined in claim 4, wherein said porous material is a porous alumina.

10. Heating apparatus as defined in claim 2, wherein said first and second carriers are mixed together to form a mixture of a cylindrical shape enclosed by two exterior and interior heat-resistant metallic nets for defining a central elongated tubular hollow portion closed at one end.

11. Heating apparatus as defined in claim 2, wherein said second carrier is shaped to a cylindrical layer having a central elongated tubular hollow portion closed at one end and said first carrier is shaped to a cylindrical layer disposed on said second carrier and enclosed by an exterior heat-resisting metallic net.

12. Heating apparatus as defined in claim 2, wherein said second carrier contains catalyzer substances selected from the platinum group, cerium oxide, vanadium pentoxide or tungsten oxide.

13. Heating apparatus as defined in claim 1, wherein said electrical power source is a rechargeable cell.

14. Heating apparatus as defined in claim 1, wherein said electrical power source is a piezoelectric element triggerable for developing a voltage.

15. Heating apparatus as defined in claim 1, wherein said ignition means is a heater element disposed in said combustion chamber.

16. Heating apparatus as defined in claim 1 wherein said ignition means is an electrical spark plug.

17. Heating apparatus as defined in claim 1, wherein said means for selectively closing said inition circuit means is a depressable button.

18. Heating apparatus as defined in claim 1, wherein said means for selectively closing said ignition circuit means includes means which selectively makes and breaks contact with said ignition means whereby said ignition means and power source can electrically be connected.

19. Heating apparatus as defined in claim 1, wherein said heat conductor member forms an integral part of said combustion chamber.

20. Heating apparatus as defined in claim 1, wherein said heat conductor member is removaly mounted to said combustion chamber.

21. Heating apparatus as defined in claim 1, wherein said heating tip is a cutter.

22. Heating apparatus as defined in claim 1, wherein said heating tip is a soldering tip.

23. Heating apparatus as defined in claim 1, wherein said heat conductor member is a tubular hollow rod for having a rod-shape adhesive therein, having a tapered tip having an opening through which a melted adhesive is excluded.

* * * * *